(12) United States Patent
Yazawa et al.

(10) Patent No.: US 6,560,076 B1
(45) Date of Patent: May 6, 2003

(54) THIN-FILM MAGNETIC WRITE HEAD

(75) Inventors: Hisayuki Yazawa, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 227 days.

(21) Appl. No.: 09/651,627

(22) Filed: Aug. 30, 2000

(30) Foreign Application Priority Data

Sep. 2, 1999 (JP) .............................................. 11-248526

(51) Int. Cl.⁷ .............................. G11B 5/33; G11B 5/147
(52) U.S. Cl. ...................................... 360/317; 360/126
(58) Field of Search ................................. 360/125, 126, 360/317

(56) References Cited

U.S. PATENT DOCUMENTS

| | | |
|---|---|---|
| 5,452,164 A | 9/1995 | Cole et al. |
| 5,562,687 A | 10/1996 | Chan et al. |
| 5,649,351 A | 7/1997 | Cole et al. |
| 5,802,700 A | 9/1998 | Chen et al. |
| 6,172,848 B1 * | 1/2001 | Santini ........................ 360/126 |
| 6,404,601 B1 * | 6/2002 | Rottmayer et al. ......... 360/317 |
| 6,419,845 B1 * | 7/2002 | Sasaki .......................... 216/22 |

* cited by examiner

*Primary Examiner*—William Klimowicz
(74) *Attorney, Agent, or Firm*—Brinks Hofer Gilson & Lione

(57) ABSTRACT

A thin-film magnetic write head includes a lower core layer composed of a magnetic material and an upper core layer composed of a magnetic material. The upper core layer is opposed to the lower core layer with a nonmagnetic gap layer therebetween at a surface facing a recording medium. The thin-film magnetic write head writes data to be read by a thin-film magnetic read head, which has a track width $T_r$ and a distance $H_2$ between an upper shielding layer and a lower shielding layer. The length in the track width direction at a magnetic contact between the gap layer and the upper core layer is 1 μm or less. The formula $A \leq H_1 - H_2$ is satisfied A is a difference between the height of the upper surface of the gap layer on a center line in the track width direction and the height of the upper surface of the gap layer at a distance $T_r/2$ from the center line in the track width direction. $H_1$ is a gap length of the gap layer.

7 Claims, 7 Drawing Sheets

THIN-FILM MAGNETIC WRITE HEAD

BACKGROUND OF THE INVENTION

1. Field of the Invention

The present invention relates to a thin-film magnetic write head, such as a floating type magnetic head, and to a method of fabricating the same. More particularly, the invention relates to a thin-film magnetic write head suitable for track narrowing that writes data onto a recording medium as reliably-readable signals for a magnetic read head and to a method of fabricating the same.

2. Description of the Related Art

A thin-film magnetic head has an inductive head and a magnetoresistive (MR) head. The thin film magnetic head may be mounted in a hard disk drive and the like. The inductive head is for writing signals onto a recording medium, such as a hard disk. The MR head for reading signals from the recording medium.

In general, an inductive head includes a lower core layer composed of a magnetic material, an upper core layer which is opposed to the lower core layer with a nonmagnetic gap layer therebetween at a surface facing a recording medium, and a coil layer for inducing a recording magnetic field in the core layers. Magnetic signals are written onto the recording medium by means of a fringing magnetic field between both core layers.

With increasing recording density, there is a need to cope with the narrowing of the track by decreasing the track width $T_w$ of the inductive head. The track width $T_w$ is determined by the width of the edge of the upper core layer that is exposed at a surface facing the recording medium—the air-bearing surface (hereinafter "ABS").

For example, conventionally, the upper core layer is formed by a frame plating method. In the frame plating method, a resist layer patterned in the shape of the upper core layer is formed. The interior of the pattern is then plated with a magnetic material for forming the upper core layer. By removing the resist layer, an upper core layer with an edge having a width corresponding to the track width $T_w$ is obtained.

However, in the frame plating method, it is very difficult to pattern the resist layer with a minute track width $T_w$ because the resolution of exposure has limitations when the resist layer is patterned. As the recording density further increases, this problem becomes more noticeable.

Figure 10:
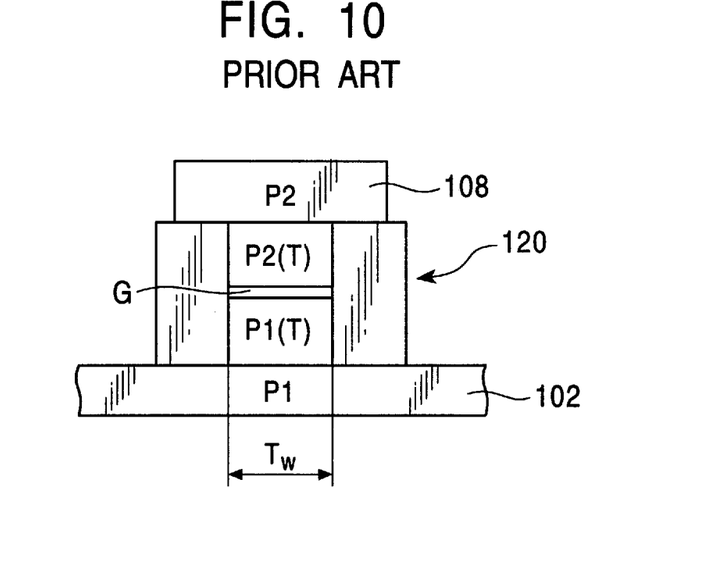
FIG. 10 is a front view of a conventional thin-film magnetic write head according to the prior art.

Japanese Unexamined Patent Application Publication No. 7-296328 (hereinafter "UNEXAMINED APPLICATION") discloses a structure of an inductive head formed by another frame plating method and a method of fabricating the same. FIG. 10 is an enlarged partial front view of the periphery of a core of the inductive head which is formed by the frame plating method disclosed in the UNEXAMINED APPLICATION.

Figure 11:
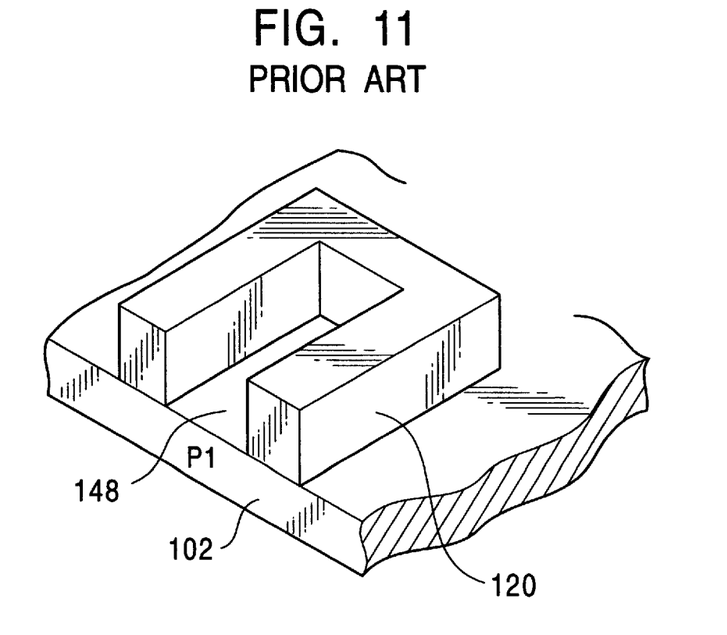
FIG. 11 is a perspective view showing the formation of the insulating layer for a conventional thin-film magnetic write head according to the prior art.

As shown in FIG. 10, a notch structure 120 composed of silicon dioxide or the like is formed on a lower pole layer (lower core layer) 102. FIG. 11 is a perspective view, which shows the shape of the notch structure 120. The notch structure 120 is provided with a trench 148. A pole tip layer P1(T), a gap layer G, and a pole tip layer P2(T) are formed by plating in the trench 148.

A pole tip 108 of an upper pole layer (upper core layer) having a larger width than that of the pole tip layer P2(T) is formed on the pole tip layer P2(T) and the notch structure 120.

The UNEXAMINED APPLICATION describes a thin-film magnetic write head having a submicron track width can be provided. The UNEXAMINED APPLICATION further describes the prevention of magnetic saturation associated with narrowing of a track by the formation of the pole tip 108 having a larger width than that of the pole tip layer P2(T), as shown in FIG. 10.

Figure 12:
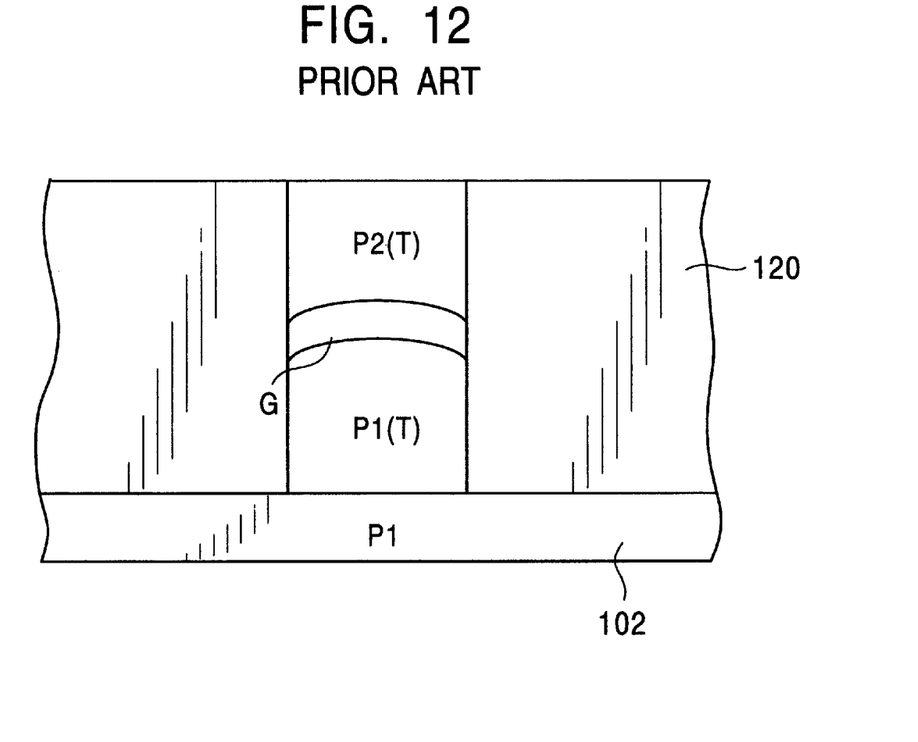
FIG. 12 is an enlarged partial front view of a conventional thin-film magnetic write head according to the prior art.

In the method described in the UNEXAMINED APPLICATION, the pole tip layer P1(T), the gap layer G, and the pole tip layer P2(T) are formed in the trench 148 by electroplating using a direct current. However, if the inner width of the trench 148 is set at 1 μm or less in order to provide a thin-film magnetic write head having a submicron track width. the surface of the pole tip layer P1(T) is curved as shown in FIG. 12. Consequently, the surface of the gap layer G deposited on the pole tip layer P1(T) is also curved.

Figure 13:
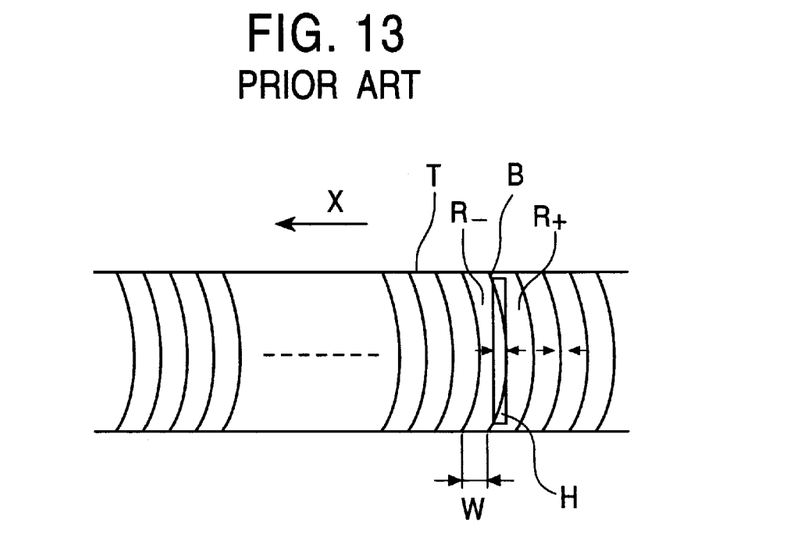
FIG. 13 is a partial front view of a recording track on a recording medium in which data have been written by a conventional thin-film magnetic write head according to the prior art.

As shown in FIG. 13, if the surface of the gap layer G is curved with respect to a recording track on a recording medium in which data are recorded by the thin-film magnetic write head, a boundary B for reversal of magnetization on the recording track is curved in the direction of motion of the magnetic track (X direction).

If the boundary B is curved, it is difficult to read the data with high definition. When a read head H is in the vicinity of the boundary B as shown in FIG. 13, both ends of the read head H and the central section of the read head H are located in reversed magnetization regions $R_+$ and $R_-$, respectively. The magnetization regions have different magnetization directions. As a result, the read outputs cancel each other out.

The surface of the pole tip layer P1(T) is curved because it is difficult to obtain uniform current distribution in the trench 148 during plating when the inner width of the trench 148 is 1 μm or less. Conventionally, when plating is performed in the trench 148, electroplating is performed using a direct current.

When electroplating is performed using a direct current, if the current density is decreased to less than 30 mA/cm², the current distribution in the trench 148 becomes nonuniform. In particular, the pole tip layer P1(T) is curved, and consequently, the gap layer G is also curved.

Even increasing the current density during electroplating so the current distribution in the trench becomes uniform is of no avail. If the current density is increased to more than 30 mA/cm² when electroplating is performed using a direct current, "burnt deposits" occur. The plating surface becomes turbid and rough, instead of being bright and uniform. Thus the quality of the gap layer G is degraded.

SUMMARY OF THE INVENTION

Accordingly, it is an object of the present invention to provide a thin-film magnetic write head in which the curvature of the surface of a gap layer is reduced even if a track width is 1 μm or less, and in which data can be written onto a recording medium as signals reliably readable by a magnetic read head. A further object is to provide a method of fabricating the thin film magnetic write head.

In one aspect of the present invention, a thin-film magnetic write head includes a lower core layer and an upper core layer with a nonmagnetic gap layer therebetween at a surface facing the recording medium (ABS). The lower core layer is composed of a magnetic material. The upper core layer is composed of a magnetic material that is opposed to the lower core layer. The thin-film magnetic write head writes data to be read by a thin-film magnetic read head having a track width $T_r$ and a distance $H_2$ between an upper shielding layer and a lower shielding layer. A length in the track width direction (track width) at a magnetic contact between the gap layer and the upper core layer is 1 μm or less. The formula $A \leq H_1 - H_2$ is satisfied. A is a difference between the height of the upper surface of the gap layer on a center line in the track width direction and the height of the upper surface of the gap layer at a distance $T_r/2$ from the center line in the track width direction. $H_1$ is a gap length of the gap layer. $H_2$ is the distance between the upper and lower shielding layers.

Figure 1:
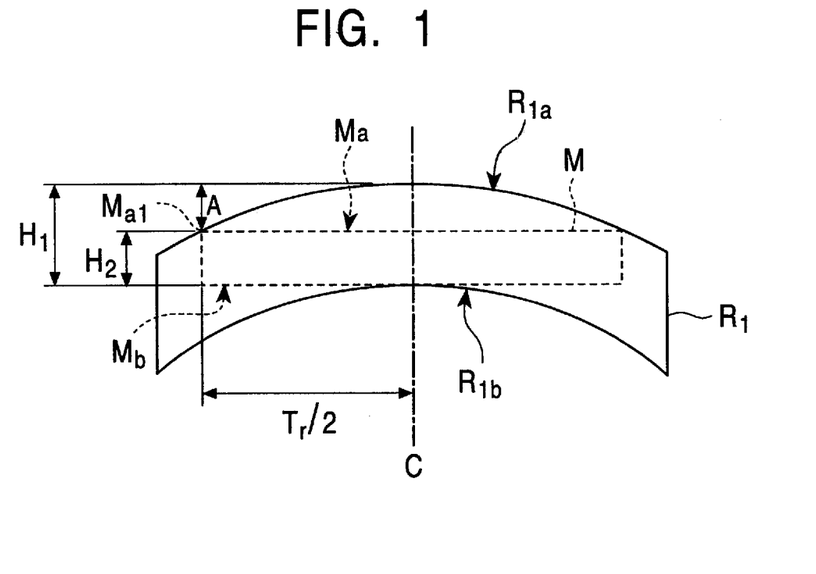
FIG. 1 is a schematic diagram illustrating a tolerance for the curvature of a gap layer of a thin-film magnetic write head according to a preferred embodiment of the present invention.

It is preferable that the surface of the gap layer of the thin-film magnetic write head is completely planar. However, in practice, a curvature is allowed to a certain extent depending on the size of the thin-film magnetic read head. The formula $A \leq H_1 - H_2$ defines a tolerance for the curvature of the gap layer. FIG. 1 is a schematic diagram illustrating the formula $A \leq H_1 - H_2$.

The thin-film magnetic write head writes data into the recording medium while reversing magnetization directions. The recording track for recording data is shaped like a band in which reversed magnetization regions $R_+$ and reversed magnetization regions $R_-$, which have opposite magnetization directions, are alternately placed, as shown in FIG. 13. A width W of the reversed magnetization region $R_+$ or $R_-$ in the track moving direction (X direction) varies depending on the content of the data to be recorded. In theory a minimum value of W is equal to the gap length $H_1$ of the gap layer of the thin-film magnetic write head. Therefore, the shape of a reversed magnetization region having the minimum width W and the frontal shape of the gap layer are identical to each other.

FIG. 1 shows a state in which the thin-film magnetic read head scans a reversed magnetization region $R_1$. The width W corresponds to the minimum value $H_1$ among the reversed magnetization regions $R_+$ and $R_-$. $H_2$ represents a distance between the upper shielding layer and the lower shielding layer of the thin-film magnetic read head. In FIG. 1, the track width $T_r$ of the thin-film magnetic read head is equal to the width of a section for reading a magnetic field in the thin-film magnetic read head. Examples of the section for reading the magnetic field include magnetoresistive elements, such as a GMR (giant magnetoresistive) element and an AMR (anistropic magnetoresistive) element.

A curvature of the gap layer of the thin-film magnetic write head is allowable as long as region M lies within the reversed magnetization region R, on the recording track. Region M has a width corresponding to the width of the section for reading the magnetic field in the thin-film magnetic read head (i.e., the track width $T_r$) and a length corresponding to the distance $H_2$ between the upper shielding layer and the lower shielding layer of the thin-film magnetic read head. When a bottom $M_b$ of the region M overlies a bottom $R_{1b}$ of the reversed magnetization region $R_1$, a corner $M_{a1}$ of a top $M_a$ of the region M should not exceed a top $R_{1a}$ of the reversed magnetization region $R_1$.

The above can be formulated in that A must be smaller than a difference between the gap length $H_1$ and the thickness $H_2$ of the region M. A is a difference between the height of the upper surface of the gap layer on a center line C and the height of the upper surface of the gap layer at a distance $T_r/2$ from the center line C in the track width direction.

FIG. 1 shows a state in which the equation $A \leq H_1 - H_2$ is satisfied. In FIG. 1, when the bottom $M_b$ of the region M overlies the bottom $R_{1b}$ of the reversed magnetization region $R_1$, the corner $M_{a1}$ of the top $M_a$ of the region M lies on the top $R_{1a}$ of the reversed magnetization region $R_1$. If the gap layer is more curved than the state shown in FIG. 1, the value A increases, resulting in $A > H_1 - H_2$. The corner $M_{a1}$ of the top $M_a$ of the region M would exceed the top $R_{1a}$ of the reversed magnetization region $R_1$.

If the formula $A \leq H_1 - H_2$ is satisfied, the curvature of the gap layer is reduced so that the region M lies within the range of the reversed magnetization region $R_1$ on the recording track. The magnetic read head can read the signals recorded on the reversed magnetization region $R_1$ reliably and clearly.

In the present invention, the curvature of the gap layer of the thin-film magnetic write head can be confined within a practically allowable range. Even when the thin-film magnetic write head is formed with a track width of 1 μm or less, data are recorded on the recording medium as signals which are reliably read by the magnetic read head.

In the present invention, preferably, the gap layer is composed of at least one nonmagnetic metallic material selected from the group consisting of NiP, NiPd, NiPt, NiRh, NiW, NiMo, Au, Pt, Rh, Pd, Ru, Cr, Ag, and Cu.

In the present invention, to facilitate the narrowing of the track width, the thin-film magnetic write head preferably includes a lower core layer, an insulating layer, a lower pole layer, a gap layer, an upper pole layer, and an upper core layer. The insulating layer is formed on the lower core layer. The insulating layer has a trench with an inner width corresponding to the track width. The trench extends from the surface facing the recording medium (ABS) in the height direction. The lower pole layer is formed on the lower core layer in the trench. The gap layer is formed on the lower pole layer in the trench. The upper pole layer formed on the gap layer in the trench. The upper core layer is in magnetic contact with the upper pole layer.

Another aspect of the present invention, provides a method of fabricating a thin-film magnetic write head having a lower core layer composed of a magnetic material, and an upper core layer composed of a magnetic material that is opposed to the lower core layer, and a gap layer therebetween at a surface facing a recording medium (ABS). The method includes: forming the lower core layer by plating; forming an insulating layer on the lower core layer, the insulating layer having a trench with an inner width corresponding to a track width, the trench extending from the surface facing the recording medium in the height direction; of forming a lower pole layer by plating on the lower core layer in the trench; forming the gap layer by plating using a nonmagnetic metallic material on the lower pole layer in the trench; forming an upper pole layer by plating on the gap layer in the trench; and forming the upper core layer by plating on the upper pole layer, the upper core layer being magnetically in contact with the upper pole layer. At least the forming of the lower pole layer is performed by electroplating using a pulsed current. The forming of any or all of the lower and upper core layers and the upper and lower pole layers may also be performed by electroplating using a pulsed current.

In the present invention, since at least the formation of the lower pole layer by plating, is performed by electroplating using a pulsed current, the total supply of charge can be reduced while increasing the maximum value of the supply of charge (electric current) per second when the lower pole layer is formed due to plating. Therefore, the present invention provides a current with an intensity sufficient to produce a uniform current density during plating and avoid burnt deposits due to plating.

Consequently, in accordance with the present invention, the lower pole layer and the gap layer can be formed with reduced curvature of the surfaces and with high quality.

Additionally, the formation of the gap layer by plating may be performed either by electroplating using a pulsed current or electroplating using a direct current.

However, to avoid switching from one apparatus to another and provide other manufacturing benefits the formation of the gap layer, the upper pole layer, and the formation of the lower core layer and the upper and lower core layers may be performed by electroplating using a pulsed current.

The present invention is particularly effective when the insulating layer forms a trench with an inner width of 1 μm or less.

If the inner width of the trench is 1 μm or less, the current distribution in the trench easily becomes nonuniform. It is very difficult to prevent the surface of the lower pole layer from curving when plating is performed using a small direct current so as not to produce burnt deposits.

When the lower pole layer is formed by plating using a pulsed current as in the present invention, it is possible to reduce the total supply of charge while increasing the maximum value of the supply of charge (electric current) per second.

With the present invention, even if the inner width of the trench is 1 μm or less, it is easy to maintain uniform current distribution in the trench and to prevent burnt deposits from occurring. The lower pole layer can be formed with reduced curvature and high quality. The gap layer on the lower pole layer can be formed with reduced curvature.

In accordance with the method of fabricating the thin-film magnetic write head of the present invention, the thin-film magnetic write head is fabricated for writing signals to be read by a thin-film magnetic read head having a track width $T_r$ and a distance $H_2$ between an upper shielding layer and a lower shielding layer. Preferably, the formation of the gap layer is performed so that the formula $A \leq H_1 - H_2$ is satisfied. A is the difference between the height of the upper surface of the gap layer on a center line in the track width direction and the height of the upper surface of the gap layer at a distance $T_r/2$ from the center line in the track width direction. $H_1$ is a gap length of the gap layer.

A curvature of the gap layer of the thin-film magnetic write head is tolerable as long as the region M in FIG. 1 lies within the reversed magnetization region $R_1$ on the recording track. If the gap layer is formed to satisfy the formula $A \leq H_1 - H_2$, the curvature of the gap layer is confined within the tolerance.

The gap layer may be composed of at least one nonmagnetic metallic material selected from the group consisting of Nip, NiPd, NiPt, NiRh, NiW, NiMo, Au, Pt, Rh, Pd, Ru, Cr, Ag, and Cu.

When any of the upper and lower core layers, gap layer, and upper and lower pole layers are formed by electroplating using a pulsed current, preferably, the current density is set in the range from 30 to 150 mA/cm$^2$.

In the present invention, since at least one of the upper and lower core layers, gap layer, and upper and lower pole layers are formed by electroplating using a pulsed current, the current density can be increased during plating. However, if the current density is too large, burnt deposits may occur. In order to prevent burnt deposits from occurring, the current density is preferably set at 150 mA/cm$^2$ or less. If the current density is too small, the curvature of the surface of the gap layer increases. Therefore the current density is preferably set at 30 mA/cm$^2$ or more. If the current density is less than 30 mA/cm$^2$, magnetic properties are degraded.

When any one of the upper and lower core layers, gap layer, and upper and lower pole layers are formed by electroplating using a pulsed current, preferably, the current-applying period is set in the range from 25 to 500 msec.

If the current-applying period is too long during electroplating, the total supply of charge is increased, resulting in burnt deposits. Therefore, the current-applying period is set at 500 msec or less.

If the current-applying period is too short, the formation by plating may take an excessively long time. Additionally, the magnetic properties of the resulting magnetic layers— the upper and lower core layers and the upper and lower pole layers—are degraded. Therefore, the current-applying period is preferably set at 25 msec or more.

When any one of the upper and lower core layers, gap layer, and upper and lower pole layers are formed by electroplating using a pulsed current, more preferably, the current-applying period is set in the range from 50 to 300 msec.

If the current-applying period is set in the range from 50 to 300 msec, burnt deposits can be avoided and the resulting magnetic layers have satisfactory magnetic properties.

When any one of the upper and lower core layers, gap layer, and upper and lower pole layers are formed by electroplating using a pulsed current, preferably, the duty ratio—the ratio of the ON time to the OFF time—of the pulsed current is set in the range from 1/11 to 1/2.

If the duty ratio of the pulsed current is too large, that is, the quiescent period after the current-applying period is too short, the total supply of charge is increased, resulting in burnt deposits. If the duty ratio is too large, in particular, when the upper and lower core layers and the upper and lower pole layers are performed by electroplating using a pulsed current, the magnetic properties of the resulting magnetic layers are degraded. Therefore, the duty ratio of the pulsed current is preferably set at 1/2 or less.

If the duty ratio is too small, the formation by plating takes an excessively long time, which is impractical. Therefore, the duty ratio is preferably set at 1/11 or more.

DESCRIPTION OF THE PREFERRED EMBODIMENTS

Figure 2:
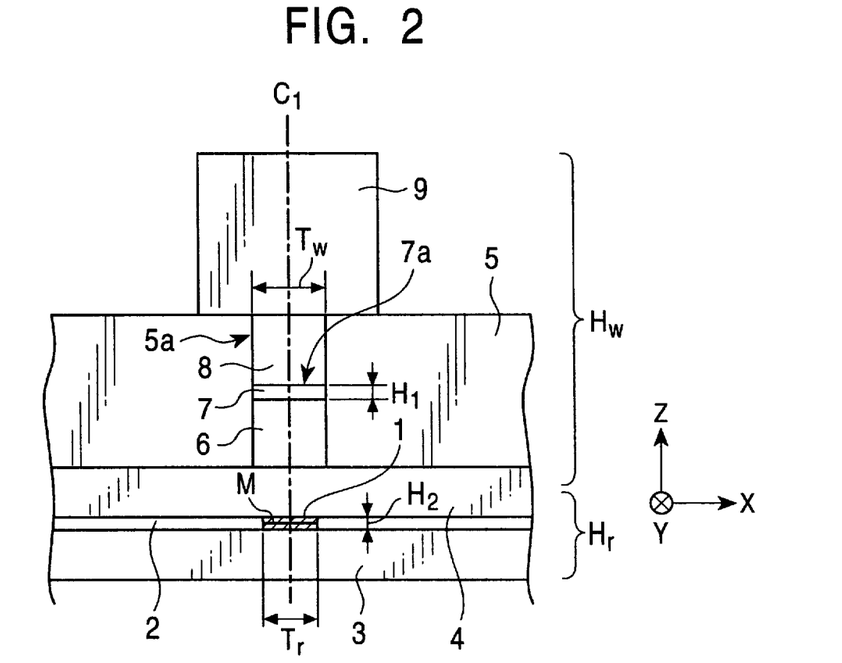
FIG. 2 is a front view of a thin-film magnetic write head according to a preferred embodiment of the present invention.

FIG. 2 is a front view of a thin-film magnetic write head according to a preferred embodiment of the present invention. The thin-film magnetic write head shown in FIG. 2 is an "inductive head" $H_w$. The inductive head $H_w$ is deposited on a magnetic read head $H_r$ exhibiting a magnetoresistive effect.

The magnetic read head $H_r$ includes a magnetic-field read section 1, a read gap layer 2, a lower shielding layer 3, and an upper shielding layer 4. The magnetic-field read section 1 is a magnetoresistive element composed of a GMR (giant magnetoresistive) element such as a spin-valve film or an AMR (anistropic magnetoresistive) element. The upper shielding layer 4 and the lower shielding layer 3 are formed above and below the magnetic-field read section 1, respectively, with the a gap layer 2 therebetween.

The length of the magnetic-field read section 1 in the track width direction (X direction) corresponds to a track width $T_r$ of the magnetic read head $H_r$. The distance between the upper shielding layer 4 and the lower shielding layer 3 is represented by symbol $H_2$.

The gap layer 2 is composed of an insulating material, such as $Al_2O_3$ or $SiO_2$. The lower shielding layer 3 and the upper shielding layer 4 are composed of a soft magnetic material having a high magnetic permeability, such as an NiFe-based alloy (permalloy).

In the inductive head $H_w$, an insulating layer 5 composed of an insulating material is formed on a lower core layer 4 which also acts as the upper shielding layer. The insulating material is at least one material selected from the group consisting of AlO, $Al_2O_3$, $SiO_2$, $Ta_2O_5$, TiO, $TiO_2$, $Ti_2O_3$, AlN, AlSiN, TiN, SiN, $Si_3N_4$, NiO, $Ni_3O_4$, $Ni_2O_3$, WO, $WO_2$, $W_2O_5$, $WO_3$, BN, and CrN. The insulating layer 5 may be a single layer or a multi-layered film.

The insulating layer 5 is provided with a trench 5a, which is formed with a predetermined length from a surface facing a recording medium—air bearing surface (ABS) in the height direction (Y direction in the drawing). The trench 5a is formed by reactive ion etching (RIE) as will be described below with respect to a fabrication method. Other forming methods may be used. As shown in FIG. 2, the width of the trench 5a formed in the insulating layer 5 is defined as a track width $T_w$ of the inductive head. The track width $T_w$ is set, preferably, at 1.0 μm or less, and more preferably, at 0.7 μm or less.

A lower pole layer 6, which is magnetically coupled to the lower core layer 4, is formed in the trench 5a formed in the insulating layer 5.

The lower pole layer 6 is composed of a magnetic material, such as NiFe, and may be composed of the same material as or a different material from that of the lower core layer 4. In this embodiment, the lower pole layer 6 is formed in the trench 5a by electroplating using a pulsed current. The lower pole layer 6 is formed in a rectangular shape with a uniform thickness in the trench 5a by the plating.

A gap layer 7 is deposited on the lower pole layer 6 in the trench 5a.

In this embodiment, the gap layer 7 is composed of a nonmagnetic metallic material, and is formed by electroplating using a pulsed current in the trench 5a. The gap layer 7 is formed in a rectangular shape with a uniform thickness on the lower pole layer 6 by the plating. The gap layer 7 has a gap length $H_1$.

In the present invention, the nonmagnetic metallic material is preferably at least one material selected from the group consisting of NiP, NiPd, NiPt, NiRh, NiW, NiMo, Au, Pt, Rh, Pd, Ru, Cr, Ag, and Cu. The gap layer 7 may be a single layer or a multi-layered film.

An upper pole layer 8 is further deposited on the gap layer 7 in the trench 5a. The upper pole layer 8 is magnetically coupled to an upper core layer 9. As described below, the upper core layer 9 is formed by plating using a magnetic material, such as NeFi, in the same manner as that of the lower pole layer 6. The upper pole layer 8 may be composed of the same material as or a different material from that of the upper core layer 9.

The upper core layer 9 is formed with a width which is larger than the track width $T_w$, as shown in FIG. 2. Therefore, the upper core layer 9 can be easily and properly formed in a predetermined shape by frame plating in comparison with a case in which the edge of the upper core layer 9 exposed at the ABS must be formed with a minute track width $T_w$.

A coil layer (not shown in the drawing) is spirally patterned on the insulating layer 5 to extend in the height direction at the rear of the trench 5a.

When a recording current is applied to the coil layer, a recording magnetic field is induced in the lower core layer 4 and the upper core layer 9. A fringing magnetic field occurs between the lower pole layer 6 and the upper pole layer 8 which are opposed to each other with the gap layer 7 therebetween. Magnetic signals are written into a recording medium, such as a hard disk, by means of the fringing magnetic field.

By forming the lower pole layer 6 in the trench 5a having the track width $T_w$, any fringing magnetic field occurring between the upper pole layer 8 and the lower pole layer 6 can be restricted within the track width $T_w$. The lower pole layer 6 is magnetically coupled to the lower core layer 4. The upper pole layer 8 is formed on the lower pole layer 6 with the gap layer 7 therebetween and is magnetically coupled to the upper core layer 9. The track width $T_w$, is 1.0 μm or less.

In the inductive head Hw in this embodiment, the curvature of the gap layer 7 is reduced in comparison with the conventional example. The gap layer 7 is substantially planarized. The relationship $A \leq H_1 - H_2$ is established. A is a difference between the height of an upper surface 7a of the gap layer 7 on a center line $C_1$ in the track width direction and the height at a distance of a half of the track width $T_r$ ($T_r/2$) of the magnetic read head $H_r$ from the center line $C_1$ in the track width direction. $H_1$ is the gap length of the inductive head $H_w$ and $H_2$ is the distance between the upper shielding layer 4 and the lower shielding layer 3 of the magnetic read head $H_r$.

The diagonally shaded area including the magnetic-field read section 1 of the magnetic read head Hr shown in FIG. 2 corresponds to a region M shown in FIG. 1.

If the relationship $A \leq H_1 - H_2$ is satisfied, the diagonally shaded area corresponding to the region M is confined within all of the reversed magnetization regions of the recording track into which data are written by the inductive head $H_w$.

That is, the inductive head $H_w$ in this embodiment can write data onto the recording medium as signals reliably readable by the magnetic read head $H_r$.

A first method of fabricating the inductive head $H_w$ according to the present invention is described.

Figure 3:
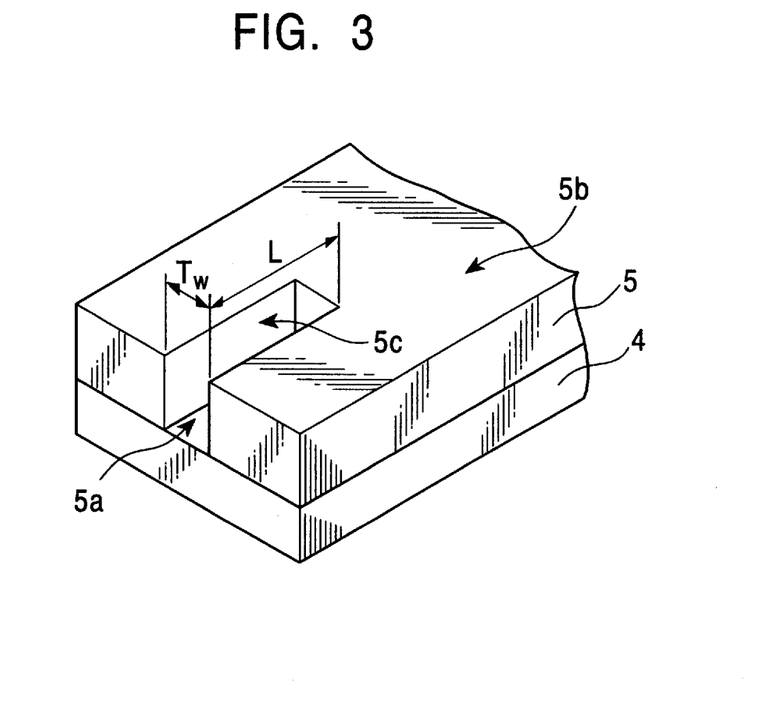
FIG. 3 is a perspective view showing the formation of the insulating layer on the lower core layer according to a first method of fabricating a thin-film magnetic write head of the present invention.

As shown in FIG. 3, after the magnetic read head $H_r$ is formed, the insulating layer 5 is formed on the lower core layer 4 which also acts as the upper shielding layer of the magnetic read head $H_r$ formed by plating.

In order to form the lower core layer 4, electroplating using a direct current may be employed. However, since electroplating using a pulsed current is employed in some later step, the lower core layer 4 is preferably formed by electroplating using a pulsed current to save time for switching from one apparatus to another and for other manufacturing reasons.

The insulating material used as the insulating layer 5 is at least one material selected from the group consisting of AlO, $Al_2O_3$, $SiO_2$, $Ta_2O_5$, TiO, $TiO_2$, $Ti_2O_3$, AlN, AlSiN, TiN, SiN, $Si_3N_4$, NiO, $Ni_3O_4$, $Ni_2O_3$, WO, $WO_2$, $W_2O_5$, $WO_3$, BN, and CrN. The insulating layer 5 is formed as a single layer or a multi-layered film by sputtering, vapor deposition, or the like.

Additionally, the insulating layer 5 has a thickness of approximately 1.0 to 4.0 $\mu$m.

Next, a resist material is applied over the insulating layer 5 by spin coating or the like. The trench 5a having a width which is substantially the same as the track width $T_w$, as shown in FIG. 3, is formed in the insulating layer 5 by the exposure and development of the resist and by anisotropic etching. The trench 5a is formed at a width of 1.0 $\mu$m or less, and preferably, 0.7 $\mu$m or less.

The length L of the trench 5a is substantially the same as or longer than the gap depth of the inductive head $H_w$.

Additionally, as the anisotropic etching, for example, reactive ion etching (RIE) may be used.

When the trench 5a is formed by anisotropic etching, a surface 5b of the insulating layer 5 is perpendicularly cut. The angle between a side 5c of the trench 5a and the surface 5b of the insulating layer 5 is approximately 830 to 900.

Next, the lower pole layer 6 composed of NiFe, which is magnetically coupled to the lower core layer 4, is formed in the trench 5a by electroplating using a pulsed current.

In this embodiment, since the lower pole layer 6 is formed by electroplating using a pulsed current, the total supply of charge can be reduced while increasing the maximum value of the supply of charge (electric current) per second when the lower pole layer 6 is formed by plating. Therefore, it is possible to supply a current with an intensity sufficient to produce a uniform current density and also to avoid burnt deposits due to plating. Consequently, the curvature of the surface of the lower pole layer 6 can be reduced and substantially planarized.

The magnetic material used as the lower pole layer 6 may be the same as or different than the magnetic material used for forming the lower core layer 4.

The gap layer 7 is formed on the lower pole layer 6 in the trench 5a by plating. Since the gap layer 7 is very thin, even if the gap layer 7 is formed by electroplating using a direct current, the gap layer 7 is not greatly curved. However, to save time for switching from one apparatus to another and for other manufacturing benefits preferably, the gap layer 7 is formed by electroplating using a pulsed current—the same as the lower pole layer 6.

If the curvature of the surface of the lower pole layer 6 is reduced because the lower pole layer 6 is formed by electroplating using a pulsed current, the curvature of the gap layer 7 formed on the lower pole layer 6 is also reduced.

Therefore, as shown in FIG. 2, when the inductive head $H_w$ is formed for writing signals readable by the thin-film magnetic read head $H_r$ with the track width $T_r$ and the distance $H_2$ between the upper shielding layer 4 and the lower shielding layer 3, the gap layer 7 can be formed so as to satisfy the formula $A \leq H_1 - H_2$. A is a difference between the height of the upper surface 7a of the gap layer 7 on the center line $C_1$ in the track width direction and the height at a distance of a half of the track width $T_r$ from the center line $C_1$ in the track width direction, and $H_1$ is the gap length.

If the formula $A \leq H_1 - H_2$ is satisfied, the diagonally shaded area including the magnetic-field read section 1 shown in FIG. 2 corresponding to the region M shown in FIG. 1 is confined within all of the reversed magnetization regions of the recording track onto which data are written by the inductive head $H_w$.

That is, the curvature of the gap layer 7 of the inductive head $H_w$ can be reduced so that the region M is confined within the reversed magnetization region on the recording track onto which signals are written by the inductive head $H_w$.

In the present invention, the gap layer 7 is composed of a nonmagnetic metallic material, and preferably, at least one material selected from the group consisting of NiP, NiPd, NiPt, NiRh, NiW, NiMo, Au, Pt, Rh, Pd, Ru, Cr, Ag, and Cu is used. The gap layer 7 may be a single layer or a multi-layered film.

Furthermore, the upper pole layer 8 is composed of NiFe and is formed on the gap layer 7 in the trench 5a by plating. The upper pole layer 8 is magnetically coupled to the upper core layer 9 and may be composed of the same material as or a different material from that of the upper core layer 9.

Since it is acceptable that the surface of the upper pole layer 8 be curved as long as the upper pole layer 8 is magnetically coupled to the upper core layer 9, the upper pole layer 8 may be formed by electroplating using a direct current. However, in order to save time for switching from one apparatus to another and other manufacturing benefits preferably, the upper pole layer 8 is formed by electroplating using a pulsed current—the same as the lower pole layer 6.

FIGS. 4 to 9 are perspective views illustrating a second method of fabricating the inductive head $H_w$ according to the present invention.

Figure 4:
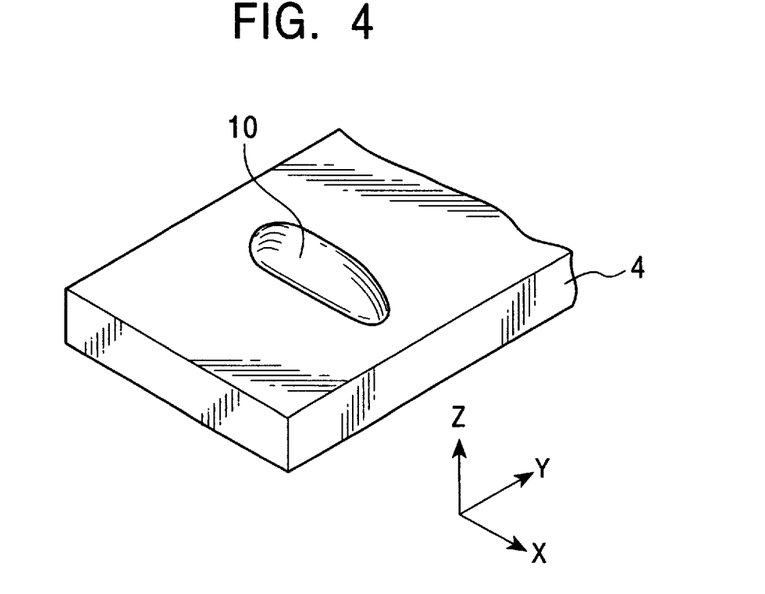
FIG. 4 is a perspective view showing the formation of the $G_d$-setting insulating layer according to a second method of fabricating a thin-film magnetic write head of the present invention.

As shown in FIG. 4, an underlying layer (not shown in the drawing) composed of a magnetic material, such as permalloy, is formed on the lower core layer 4. A Gd-setting insulating layer 10 composed of a resist or the like is formed at a predetermined section on the underlying layer.

In the formation process of the Gd-setting insulating layer 10, after a resist layer is formed in a rectangular shape, post baking (heat treatment) is performed, and thus sagging occurs. As shown in FIG. 4, an inclined plane, which gradually inclines toward the height direction (Y direction in the drawing) from the lower core layer 4 in the Z direction in the drawing, is formed on the front end of the Gd-setting insulating layer 10 composed of the resist layer. After the heat treatment is performed, the Gd-setting insulating layer 10 is cured by ultraviolet-light irradiation.

Figure 5:
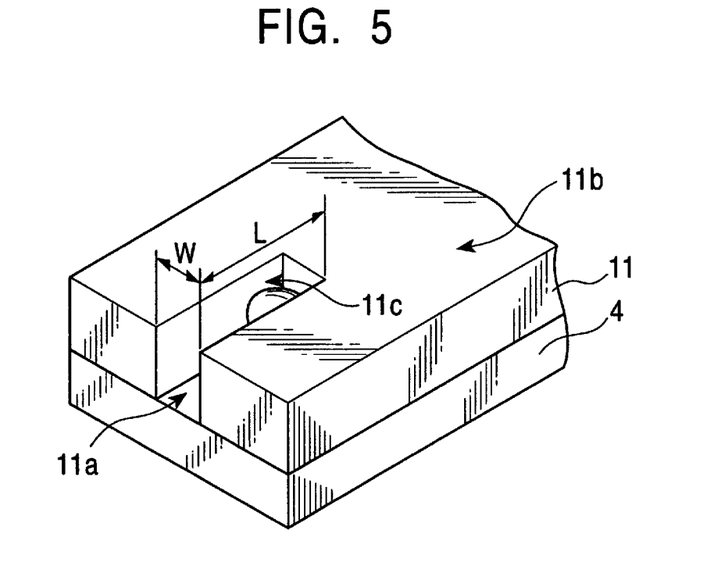
FIG. 5 is a perspective view showing the formation of the resist layer according to a second method of fabricating a thin-film magnetic write head of the present invention.

Next, as shown in FIG. 5, a resist layer 11 is formed by coating on the lower core layer 4. A trench 11a with a width W is formed in the resist layer 11 by exposure and development and by anisotropic etching. The width W of the trench 11a is set at 1.0 $\mu$m or less, and preferably, 0.7 $\mu$m or less.

The length L of the trench 11a is substantially the same as or longer than the gap depth of the inductive head $H_w$.

Additionally, reactive ion etching (RIE) may be used as the anisotropic etching.

When the trench 11a is formed by anisotropic etching, a surface 11b of the resist layer 11 is perpendicularly cut. An angle between a side 11c of the trench 11a and the surface 11b of the resist layer 11 is approximately 83° to 900°.

Next, the lower pole layer 6 composed of NiFe, which is magnetically coupled to the lower core layer 4, is formed in the trench 11a by electroplating using a pulsed current.

In this embodiment, since the lower pole layer 6 is formed by electroplating using a pulsed current, the total supply of charge can be reduced while increasing the maximum value of the supply of charge (electric current) per second. Therefore, it is possible to supply a current with an intensity sufficient to produce a uniform current density and also to avoid burnt deposits due to plating. Consequently, the curvature of the surface of the lower pole layer 6 can be reduced and substantially planarized.

The magnetic material used as the lower pole layer 6 may be the same as or different from the magnetic material used for the lower core layer 4.

Furthermore, the gap layer 7 is formed on the lower pole layer 6 in the trench 11a by plating. Since the gap layer 7 is very thin, even if the gap layer 7 is formed by electroplating using a direct current, the gap layer 7 is not greatly curved. However, in order to save time for switching from one apparatus to another, and for other manufacturing benefits preferably, the gap layer 7 is formed by electroplating using a pulsed current—the same as the lower pole layer 6.

If the curvature of the surface of the lower pole layer 6 is reduced because the lower pole layer 6 is formed by electroplating using a pulsed current, the curvature of the gap layer 7 formed on the lower pole layer 6 is also reduced.

In the present invention, the gap layer 7 is composed of a nonmagnetic metallic material, and preferably, at least one material selected from the group consisting of NiP, NiPd, NiPt, NiRh, NiW, NiMo, Au, Pt, Rh, Pd, Ru, Cr, Ag, and Cu is used. The gap layer 7 may be a single layer or a multi-layered film.

Furthermore, the upper pole layer 8 composed of NiFe is formed on the gap layer 7 in the trench 11a by plating. The upper pole layer 8 is magnetically coupled to the upper core layer 9 and may be composed of the same material as or a different material from that of the upper core layer 9.

Since the upper surface of the upper pole layer 8 is planarized by grinding later, it is acceptable that the surface of the upper pole layer 8 be curved immediately after the formation by plating. Therefore, the upper pole layer 8 may be formed by electroplating using a direct current. However, in order to save time for switching from one apparatus to another for other manufacturing reasons preferably, the upper pole layer 8 is formed by electroplating using a pulsed current, the same as the lower pole layer 6.

Figure 6:
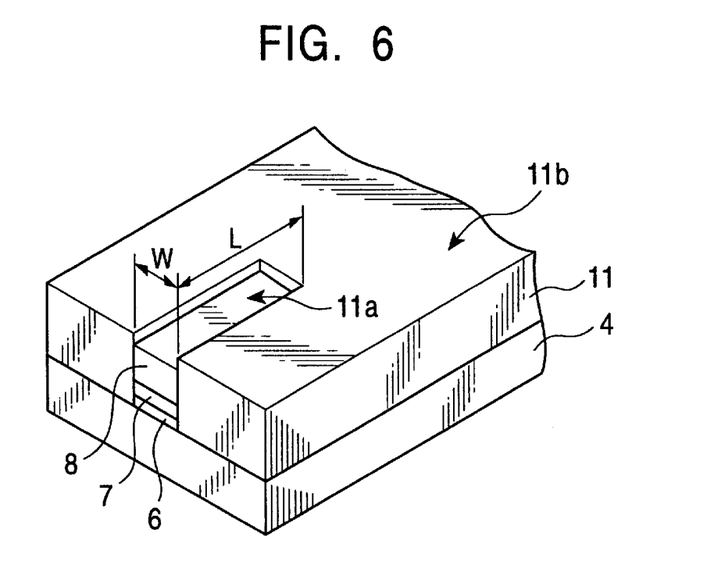
FIG. 6 is a perspective view showing the formulation of the upper and lower pole layers and the gap layer according to a second method of fabricating a thin-film magnetic write head of the present invention.

FIG. 6 shows a state in which the lower pole layer 6, the gap layer 7, and the upper pole layer 8 are formed in the trench 11a.

Figure 7:
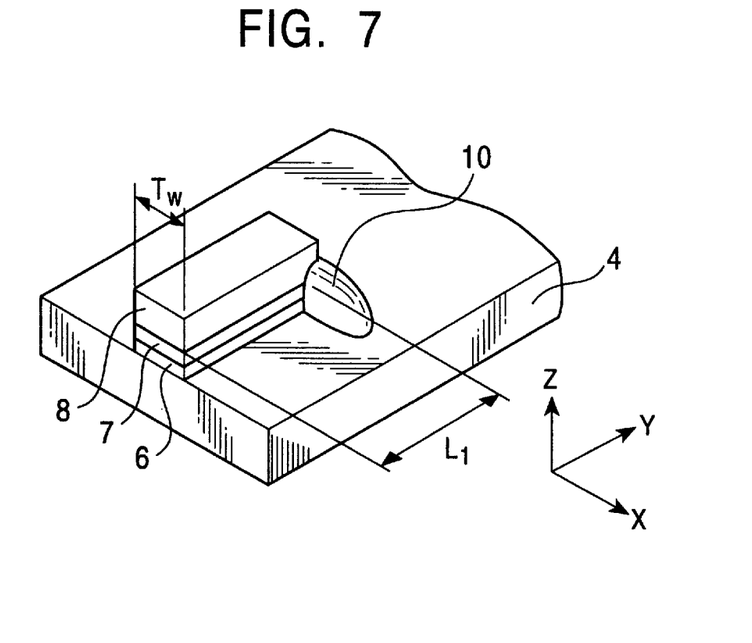
FIG. 7 is a perspective view showing the removal of the resist layer according to a second method of fabricating a thin-film magnetic write head of the present invention.

FIG. 7 shows a state in which the resist layer 11 is removed. The lower pole layer 6, the gap layer 7, and the upper pole layer 8 are deposited on the lower core layer 4 in the vicinity of the ABS.

Both sides of the lower pole layer 6, the gap layer 7, and the upper pole layer 8 (the sides in the X direction in the drawing) are cut by ion milling in the track width direction (in the X direction) to reduce the width of the lower pole layer 6, the gap layer 7, and the upper pole layer 8. The width of the upper pole layer 8 subjected to the ion milling is defined as the track width $T_w$.

Figure 8:
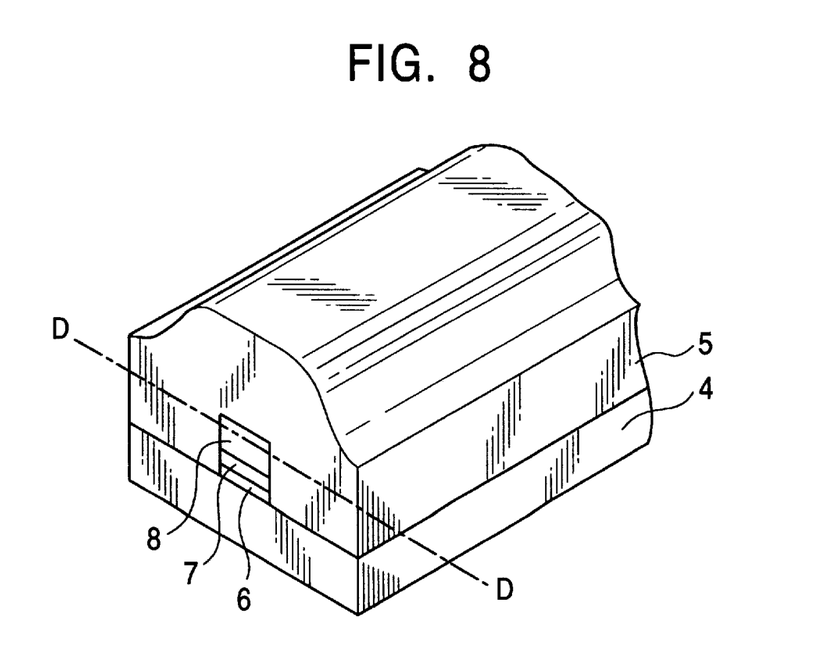
FIG. 8 is a perspective view showing the formation of the insulating layer according to a second method of fabricating a thin-film magnetic write head of the present invention.

In the step shown in FIG. 8, the insulating layer 5 is formed by sputtering from the top of the upper pole layer 8 to the top of the lower core layer 4.

The insulating layer 5 is composed of at least one material selected from the group consisting of AlO, $Al_2O_3$, $SiO_2$, $Ta_2O_5$, TiO, $TiO_2$, $Ti_2O_3$, AlN, AlSiN, TiN, SiN, $Si_3N_4$, NiO, $Ni_3O_4$, $Ni_2O_3$, WO, $WO_2$, $W_2O_5$, $WO_3$, BN, and CrN in a manner similar to that in the first fabrication method. The insulating layer 5 is formed as a single layer or a multi-layered film.

The upper surface of the insulating layer 5 is cut down to the line D—D shown in FIG. 8 by means of chemical mechanical polishing (CMP) or the like. Thus, a state shown in FIG. 9 is obtained.

Figure 9:
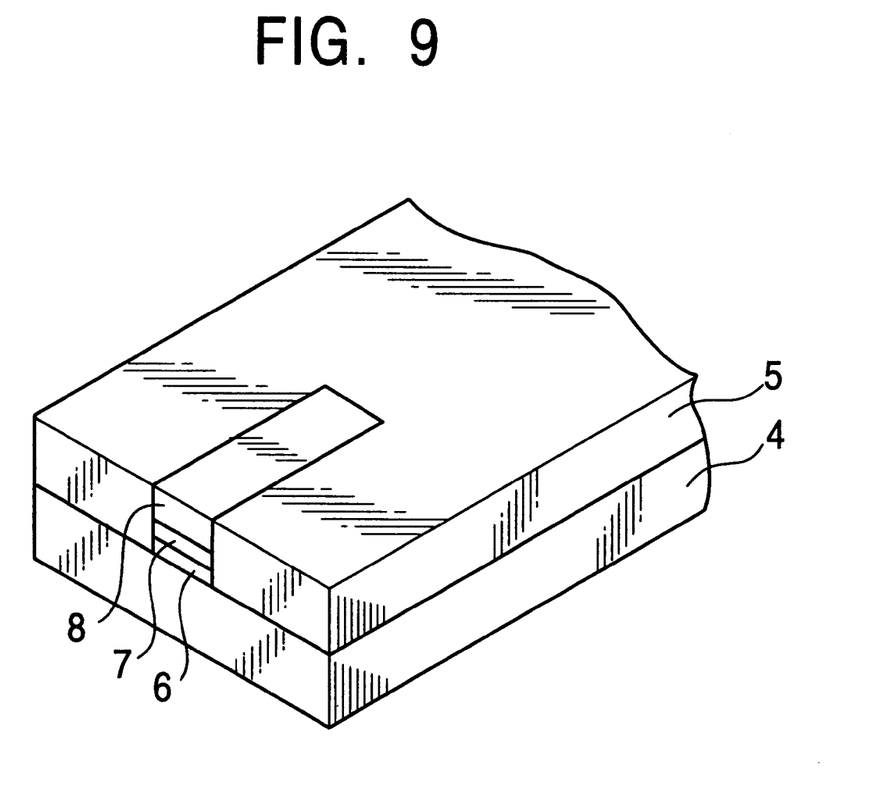
FIG. 9 is a perspective view showing the results of polishing the insulating layer according to a second method of fabricating a thin-film magnetic write head of the present invention.

By cutting the insulating layer 5 down to the line D—D, as shown in FIG. 9, the upper surface of the upper pole layer 8 is exposed. In FIG. 9, the insulating layer 5 has a thickness of approximately 1.0 $\mu$m to 4.0 $\mu$m.

Additionally, as shown in FIG. 7, the Gd-setting insulating layer 10 has the inclined plane in which the front end thereof gradually departs from the surface facing the recording medium (ABS) from the lower core layer 4 upward (in the Z direction in the drawing); The rear end of the upper pole layer 8 extends over the Gd-setting insulating layer 10.

That is, it is possible to increase the area of the joint surface between the upper pole layer 8 and the upper core layer 9 formed on the upper pole layer 8 and also to increase the volume of the upper pole layer 8. Consequently, the magnetic flux passing through the upper core layer 9 is prevented from reducing at the joint surface. The magnetic flux easily passes through the upper pole layer 8. Thus, it is possible to prevent the magnetic flux from being saturated before reaching the gap layer 7.

That is, it is possible to produce a leakage flux in the vicinity of the gap layer 7. It also is possible to perform an accurate recording even if the recording frequency is increased.

In order to increase the leakage flux in the vicinity of the gap layer 7, the area of the gap layer 7 is preferably narrowed as much as possible. In FIG. 7, the length of the upper surface of the gap layer 7 (the joint surface with the upper pole layer 8) from the front end of the Gd-setting insulating layer 10 to the surface facing the recording medium (ABS) is adjusted to $L_1$. Thus the area of the gap layer 7 does not become excessively large.

In accordance with the second fabrication method, as shown in FIG. 2, when the inductive head $H_w$ is formed for writing signals readable by the thin-film magnetic read head $H_r$ with the track width $T_r$ and the distance $H_2$ between the upper shielding layer 4 and the lower shielding layer 3, the gap layer 7 can also be formed so as to satisfy the formula $A \leq H_1 - H_2$. A is a difference between the height of the upper surface 7a of the gap layer 7 on the center line $C_1$ in the track width direction and the height at a distance of a half of the track width $T_r$ ($T_r/2$) from the center line $C_1$ in the track width direction. $H_1$ is the gap length.

In the first and second fabrication methods, after the upper pole layer 8 is formed, the coil layer (not shown in the drawing) is spirally patterned on the insulating layer 5 to extend in the height direction at the rear of the upper pole layer 8. A coil-insulating layer (not shown in the drawing) is further deposited on the coil layer.

The upper core layer 9 is formed on the coil-insulating layer by frame plating using a magnetic material, such as NiFe. The upper core layer 9 is magnetically coupled to the upper pole layer 8. Additionally, the upper core layer 9 is formed with a larger width than the track width $T_w$, as shown in FIG. 2. Therefore, the upper core layer 9 can be easily and properly formed in a predetermined shape in comparison with a case in which the edge of the upper core layer 9 exposed at the ABS must be formed with a minute track width $T_w$.

The upper core layer 9 may be formed by electroplating using a direct current. However, to save time for switching from one apparatus to another and for other manufacturing benefits preferably, the upper core layer 9 is formed by electroplating using a pulsed current.

In the methods of fabricating the inductive head $H_w$ described above, when electroplating is performed using a pulsed current, the current density is preferably set in the range from 30 to 150 mA/cm$^2$.

In the present invention, since electroplating is performed using a pulsed current, the current density can be increased during plating. However, if the current density is too large, burnt deposits may occur. In order to prevent burnt deposits from occurring, the current density is preferably set at 150 mA/cm$^2$ or less. If the current density is too small, the curvature of the surface of the gap layer 7 increases. Therefore the current density is preferably set at 30 mA/cm$^2$ or more.

When electroplating is performed using a pulsed current, the current-applying period is preferably set in the range from 25 to 500 msec.

If the current-applying period is too long during electroplating, the total supply of charge is increased, resulting in burnt deposits. Therefore, the current-applying period is preferably set at 500 msec or less.

If the current-applying period is too short, the formation by plating may take an excessively long time. If the current-applying period is too short when, magnetic layers such as the lower core layer 4, the lower pole layer 6, the upper pole layer 8, and the upper core layer 9, are formed by electroplating using a pulsed current, the magnetic properties of the resulting magnetic layers may be degraded. Therefore, the current-applying period is preferably set at 25 msec or more.

In particular, if the current-applying period is set in the range from 50 to 300 msec, burnt deposits can be avoided and the resulting magnetic layers have satisfactory magnetic properties.

Furthermore, if the duty ratio—the ratio of the ON time to the OFF time—of the pulsed current is too large, that is, if the quiescent period after the current-applying period is too short, the total supply of charge is increased, resulting in burnt deposits. If the duty ratio is too large when the magnetic layers such as the lower core layer 4, the lower pole layer 6, the upper pole layer 8, and the upper core layer 9 are formed by electroplating using a pulsed current, the magnetic properties of the resulting magnetic layers are degraded. Therefore, the duty ratio of the pulsed current is preferably set at 1/2 or less.

If the duty ratio is too small, the formation by plating takes an excessively long time, which is impractical. Therefore, the duty ratio is preferably set at 1/11 or more.

EXAMPLES

An NiFe layer corresponding to the lower pole layer 6 shown in FIG. 2 was formed by electroplating using a pulsed current. The relationship between the conditions of the pulsed current and the degree of burnt deposits on the surface of the resulting NiFe layer was investigated.

The relationship between the conditions of the pulsed current and the coercive force of the resulting NiFe layer was also investigated.

On an underlying layer composed of an NiFe alloy, an insulating layer composed of $Al_2O_3$ or $SiO_2$ having a thickness of 3.0 μm was deposited, and a trench with an inner width of 0.5 μm, a thickness of 3.0 μm, and a length of 5.0 μm was formed in the insulating layer. An NiFe layer was formed in the trench by varying the conditions of the pulsed current.

In the plating solution, the $Fe^{2+}$ concentration was set at 2 to 6 g/l and the $Ni^{2+}$ concentration was set at 40 g/l. An $Fe_aNi_{100-a}$ alloy, where 55 atomic % $\leq a \leq$ 75 atomic %, was set as the target composition of plating. Plating was performed so that the NiFe layer had a thickness of 0.5 μm.

The degree of burnt deposits was visually examined. Samples in which the NiFe layer was uniformly formed and the surface thereof was bright were judged as "Good", and samples in which the surface of the NiFe layer was rough and turbid were judged as "Burnt". The results thereof are shown in Table 1 below.

TABLE 1

| Burnt deposits Current-applying | Current density (mA/cm$^2$) | | | | |
|---|---|---|---|---|---|
| period (msec) | 10 | 30 | 100 | 150 | 200 |
| 25 | Good | Good | Good | Good | Burnt |
| 50 | Good | Good | Good | Good | Burnt |
| 100 | Good | Good | Good | Good | Burnt |
| 300 | Good | Good | Good | Good | Burnt |
| 500 | Good | Good | Good | Discolored | Burnt |

As shown in Table 1, if the current density exceeded 150 mA/cm$^2$, burnt deposits occurred in the NiFe layer. Even when the current density was 150 mA/cm$^2$, if the current-applying period was 500 msec, the surface of the NiFe layer was slightly discolored.

The relationship between the conditions of the pulsed current and the coercive force of the resulting NiFe layer is shown in table 2.

TABLE 2

| Coercive force | Current density (mA/cm²) | | | |
| --- | --- | --- | --- | --- |
| (Oe) | 10 | 30 | 100 | 150 |
| Current-applying period (msec) | | | | |
| 25 | >3 | 2 to 3 | 2 to 3 | 2 to 3 |
| 50 | >3 | ≦2 | ≦2 | ≦2 |
| 100 | >3 | ≦2 | ≦2 | ≦2 |
| 300 | >3 | ≦2 | ≦2 | ≦2 |
| 500 | >3 | ≦2 | ≦2 | ≦2 |

As shown in Table 2, if the current density was decreased to less than 30 mA/cm², the coercive force increased to more than 3 Oe. Thus, the soft magnetic properties of the NiFe layer formed by plating were beyond the practical range.

If the current-applying period was 25 msec or less, even if the current density was in the range from 30 to 150 mA/cm², the coercive force was in the range from 2 to 3 Oe, which was beyond the optimum range although within the practical range.

If the current-applying period was set in the range from 50 to 500 msec, the coercive force was 2 or less, which was within the optimum range.

The above results confirm that in order to form the soft magnetic layer such as the NiFe layer in the trench by electroplating using a pulsed current, the current density must be set in the range from 30 to 150 mA/cm². The current-applying period must be set in the range from 25 to 500 msec, and preferably, in the range from 50 to 300 msec.

Next, the NiFe layer was formed by electroplating using a pulsed current. A NiP layer corresponding to the gap layer 7 shown in FIG. 2 was further formed on the NiFe layer by plating. The relationship between the conditions of the pulsed current used for forming the NiFe layer and the curvature of the resulting NiP layer was investigated.

On an underlying layer composed of an NiFe alloy, an insulating layer composed of $Al_2O_3$ having a thickness of 3.0 μm was deposited. A trench with an inner width of 0.5 μm, a thickness of 3.0 μm, and a length of 5.0 μm was formed in the insulating layer. An NiFe layer was formed in the trench by varying the conditions of the pulsed current.

In the plating solution, the $Fe^{2+}$ concentration was set at 2 to 6 g/l and the $Ni^{2+}$ concentration was set at 40 g/l. An $Fe_aNi_{100-a}$ alloy, where 55 atomic % ≦ a ≦ 75 atomic %, was set as the target composition of plating.

After the NiFe layer was formed, an NiP layer was formed by plating on the NiFe layer.

The plating solution was composed of 1 to 7.5 g/l of $NaHPO_3 \cdot 5H_2O$, 20 g/l of $NiCl_2 \cdot 6H_2O$, 100 g/l of $NiSO_4 \cdot 6H_2O$, and 25 g/l of $H_3BO_3$.

The NiP layer was formed by plating using a direct current with a current density of 2 to 3 mA/cm².

The thickness (gap length) $H_1$ of the NiP layer formed by plating was 0.25 μm. The magnetic read head in this example, has a distance $H_2$ between an upper shielding layer and a lower shielding layer of 0.17 μm and a track width $T_r$ of 0.7 μm.

With respect to the surface of the NiP layer formed by plating, a value A was measured. A is the difference between the height on the center line in the track width the height at a distance of 0.35 μm, to a half of the track width $T_r$ of the head from the center line in the track width direction.

The results of this example are shown in Table 3.

TABLE 3

| Curvature (μm) | Current density (mA/cm²) | | | |
| --- | --- | --- | --- | --- |
| (Value A) | 10 | 30 | 100 | 150 |
| Current-applying period (msec) | | | | |
| 25 | 0.1 | 0 | 0 | 0 |
| 50 | 0.1 | 0 | 0 | 0 |
| 100 | 0.1 | 0 | 0 | 0 |
| 300 | 0.1 | 0 | 0 | 0 |
| 500 | 0.1 | 0 | 0 | 0 |

In example, the difference between $H_1$ and $H_2$ is 0.08 μm ($H_1-H_2=0.25-0.17=0.08$ μm). As shown in Table 3, when the current density of the pulsed current used for planting the NiFe layer was 10 mA/cm², the value A was 0.1. A is the difference between the height of the surface of the NiP layer formed on the NiFe layer on the center line in the track width direction and the height at a distance of 0.35 μm, corresponding to a half of the track width $T_r$ of the magnetic read head, from the center line in the track width direction. Hence, the relationship $A > H_1 - H_2$ was obtained. That is, the curvature of the NiP layer was beyond the tolerance.

In contrast, when the current density of the pulsed current used for plating the NiFe layer was within the range from 30 to 150 mA/cm² and the current-applying period was in the range from 25 to 500 msec, the value A was 0. That is, the NiP layer was not curved at all. In such a case, the surface of the NiFe layer was not curved at all.

Accordingly, to restrict the curvature of the NiP layer within the tolerance, the current density of the pulsed current used for forming the NiFe layer by plating must be set in the range from 30 to 150 mA/cm². The current-applying period must be set in the range from 25 to 500 msec.

From the results shown in Tables 1, 2, and 3, it is confirmed that the current density must be set in the range from 30 to 150 mA/cm² and the current-applying period must be set in the range from 25 to 500 msec, and preferably, from 50 to 300 msec, for the pulse current used to form the NiFe layer by plating. This current density and current-applying period prevents burnt deposits from occurring on the surface of the NiFe layer, satisfactorily decreases the coercive force of the NiFe layer, and confines the curvature of the NiP layer formed on the NiFe layer within tolerance.

As described above, in accordance with the thin-film magnetic write head of the present invention, the curvature of the gap layer of the thin-film magnetic write head can be restricted in the range in which signals can be reliably and clearly read by the thin-film read head from the recording track in which data have been written by the thin-film magnetic write head.

In particular, even when the thin-film magnetic write head is fabricated with a track width of 1 μm or less, it is possible to provide a thin-film magnetic write head which can record data on a recording medium as signals reliably readable by a magnetic read head.

In accordance with the method for fabricating the thin-film magnetic write head of the present invention, at least the formation of the lower pole layer is performed by electroplating using a pulsed current. The total supply of charge can be reduced while increasing the maximum value of the supply of charge (electric current) per second. Therefore, it is possible to feed a current with an intensity sufficient to produce a uniform current density in the trench and also to avoid burnt deposits due to plating.

Consequently, in accordance with the present invention, it is possible to fabricate the thin-film magnetic write head in which the lower pole layer is formed with reduced curvature of the surface and high quality. The curvature of the gap layer on the lower pole layer is reduced.

While the invention has been descried an illustrated, this description is by way of example only. Additional advantages will occur readily to those skilled in the art, who may make numerous changes without departing from the true spirit and scope of the invention. Therefore, the invention is not limited to the specific details, representative devices, and illustrated examples in this description. Accordingly, the scope of this invention is to be limited only as necessitated by the accompanying claims.

What is claimed is:

1. A thin-film magnetic head having a thin-film magnetic write head and a thin-film magnetic read head, wherein the thin-film magnetic write head comprises:

a lower core layer;

an upper core layer magnetically opposed to the lower core layer;

a nonmagnetic gap layer disposed between the upper and lower core layers, the nonmagnetic gap layer having a surface with a curvature within a tolerance for writing data as signals reliably-readable onto at least one reversed magnetization region of a recording medium; and wherein the thin-film magnetic read head comprises:

a lower shielding layer;

an upper shielding layer; and a reading gap layer disposed between the lower and upper shielding layers, the reading gap layer providing a magnetic-field read section having a surface region, wherein the surface region fits within the at least one reversed magnetization region.

2. A thin-film magnetic head according to claim 1, wherein the nonmagnetic gap layer has a gap length $H_1$ and a write track width $T_w$, wherein the upper shielding layer has a distance $H_2$ from the lower shielding layer, wherein the magnetic-field read section has a read track width $T_R$, wherein a tolerance A is the difference between the height of the nonmagnetic gap layer at a center line in the $T_W$ direction and the height of the nonmagnetic gap layer a distance $T_R/2$ from the center line in the $T_W$ direction, and wherein $A \leq H_1 - H_2$.

3. A thin-film magnetic head according to claim 1, further comprising:

an insulating layer disposed on the lower core layer, the insulating layer forming a trench having an inner width defining the $T_W$, the trench extending from the surface facing the recording medium in the height direction;

a lower pole layer disposed in the trench and magnetically coupled to the lower core layer; and an upper pole layer disposed in the trench and magnetically coupled to the upper core layer, wherein the nonmagnetic gap layer is disposed between the upper and lower pole layers in the trench.

4. A thin-film magnetic head according to claim 1, wherein the nonmagnetic gap layer has a write track width $T_W$ equal to or less than 1 μm.

5. A thin-film magnetic head according to claim 4, wherein the nonmagnetic gap layer has a write track width $T_W$ equal to or less than 0.7 μm.

6. A thin-film magnetic head according to claim 1, wherein the nonmagnetic gap layer comprises at least one material selected from the group consisting of NiP, NiPd, NiPt, NiRh, NiW, NiMo, Au, Pt, Rh, Pd, Ru, Cr, Ag, and Cu.

7. A thin-film magnetic head according to claim 1, wherein the lower core layer and the upper shielding layer are the same layer.

* * * * *